May 9, 1967     O. J. ALBRECHT ETAL     3,319,050
INFORMATION TRANSFER SYSTEM
Filed July 16, 1963     4 Sheets-Sheet 1
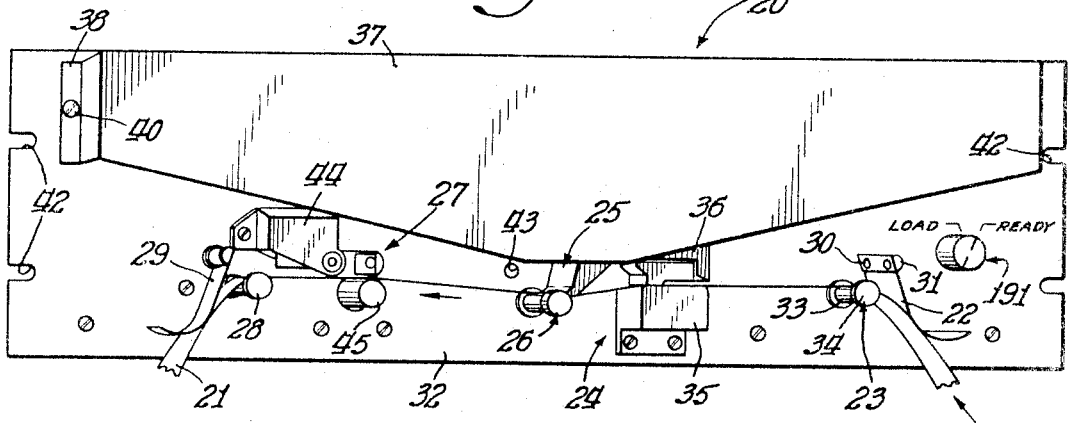
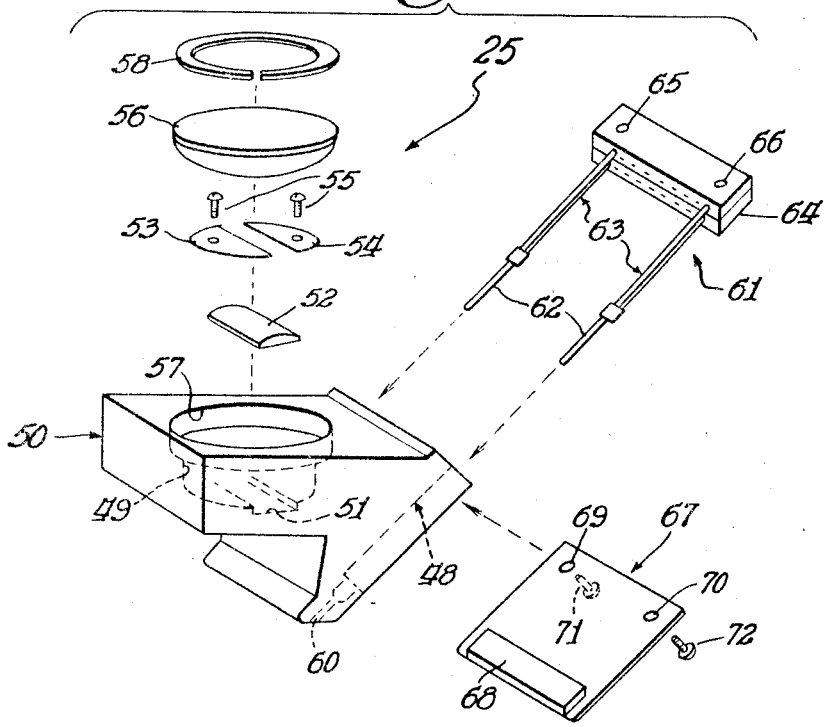
Inventors:
Otto J. Albrecht and
George A. Harris
By: James J. Jennings, Jr. Atty.

May 9, 1967 — O. J. ALBRECHT ET AL — 3,319,050
INFORMATION TRANSFER SYSTEM
Filed July 16, 1963 — 4 Sheets-Sheet 2

Inventors:
Otto J. Albrecht and
George A. Harris
By: James F. Jennings, Jr. Atty.

May 9, 1967 O. J. ALBRECHT ETAL 3,319,050
INFORMATION TRANSFER SYSTEM
Filed July 16, 1963 4 Sheets-Sheet 3
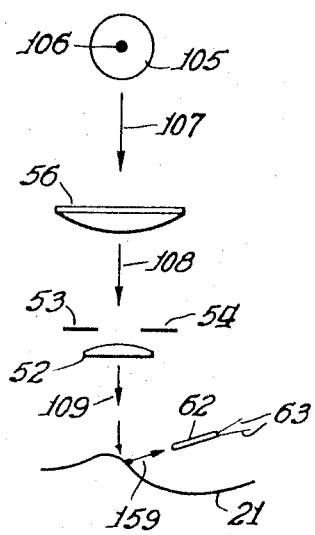
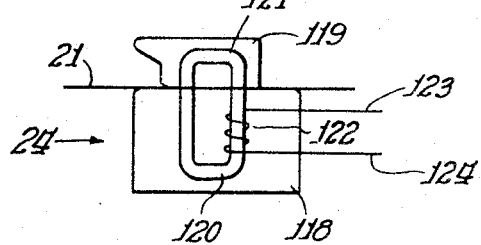
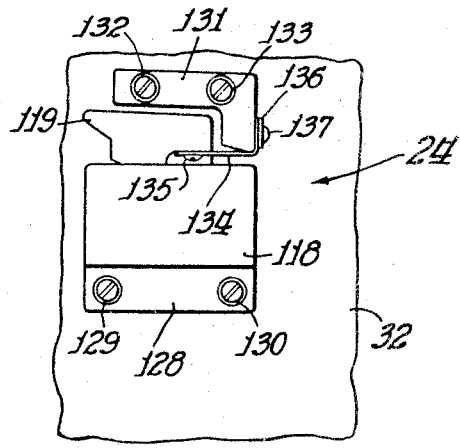
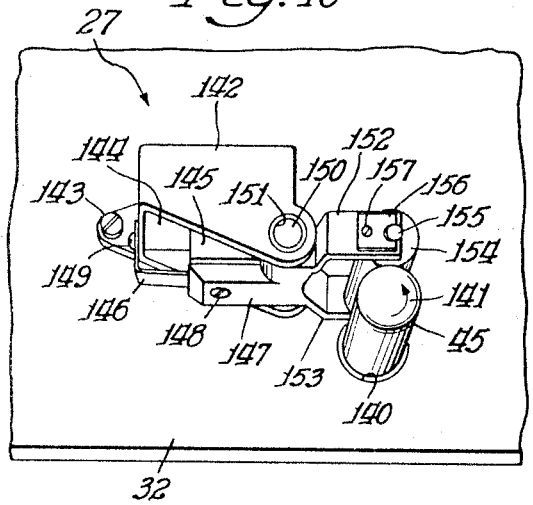
Inventors:
Otto J. Albrecht and
George A. Harris
By: James F. Jennings, Jr. Atty.

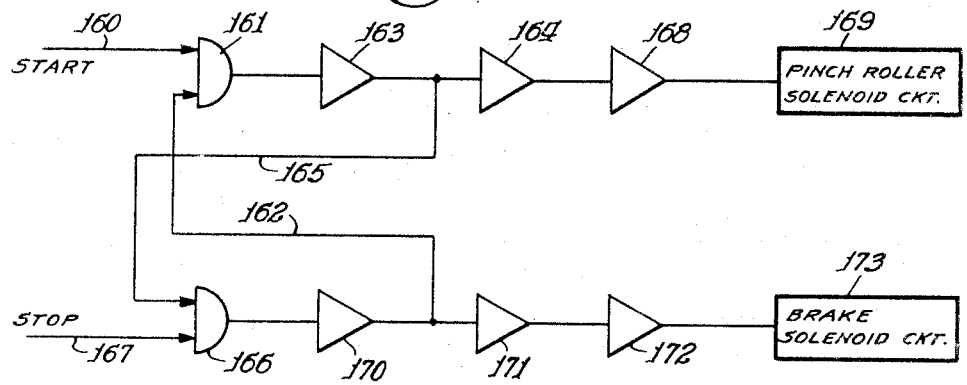
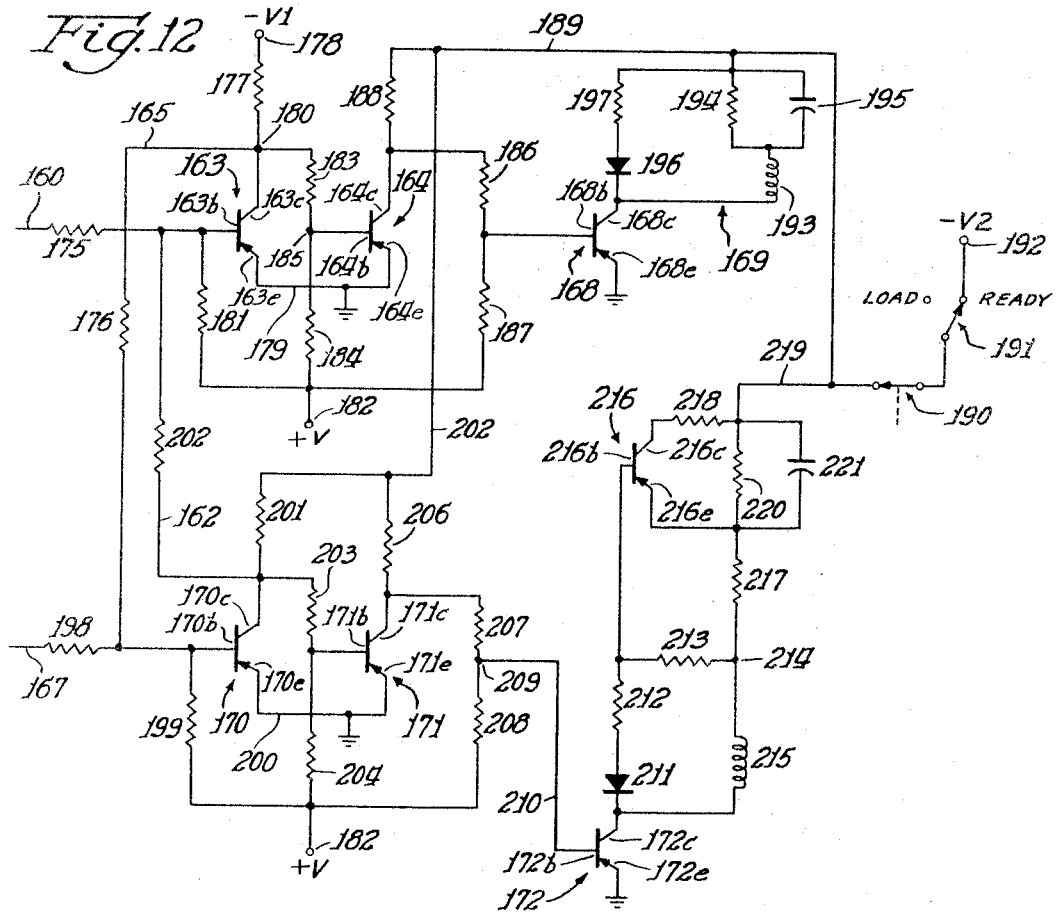

United States Patent Office 3,319,050
Patented May 9, 1967

3,319,050
INFORMATION TRANSFER SYSTEM
Otto J. Albrecht, Trenton, N.J., and George A. Harris, Malvern, Pa., assignors, by mesne assignments, to Borg-Warner Corporation, Chicago, Ill., a corporation of Illinois
Filed July 16, 1963, Ser. No. 295,320
13 Claims. (Cl. 235—61.11)

The present invention is directed to an information transfer system, and more particularly to a photoelectric reading system for accurately transferring information from tapes which differ substantially in the types of material from which the tapes are produced and the manner in which the information is signified on the tapes.

In the field of data processing, various types of information are frequently represented on a flexible carrier, or tape, by imprinting or marking thereon a plurality of "marks" to indicate a specific character or other intelligence. A "space," or the absence of a mark at a given location, also represents intelligence. Thus the mark and space can be considered as similar to the one and the zero in a binary system. One common information-signifying system utilizes an eight-channel code with an additional timing or sprocket channel, so that a mark always appears at the sprocket position on the tape, and the presence of a mark or a space at each of the other eight positions aligned with the sprocket position represents given information. Such information can be imparted to the tape by a variety of different information-imprinting systems, so that not only are tapes provided which are constituted of different papers and different types of plastic, but the color, opacity, thickness and sheen of the different tapes also vary considerably. In addition, some systems impart the information by printing or blackening an area of the tape, whereas others indicate the presence of a mark by punching a hole in the tape at such location. Still another system utilizes "chadless" tape, in which a hole is partially punched so that the presence of a mark can be determined but there is no continuous aperture in the tape at the location of the mark. Another variable is that tapes of different widths are frequently utilized by different information representing systems. With all these differences in the physical representation of data on the various tapes, it is understandable that the readers or units which remove such information from the tape have not been able to handle, at high speed and in a single unit, all of the various types of tapes and still produce an output signal which is both accurate and positive.

It is therefore a primary object of the present invention to produce a photoelectric tape reader which is accurate and positive in operation, and which achieves these results notwithstanding the substantial variety of tapes which must be "read" by one reader.

In addition to the difficulties posed by the wide range of tapes and marking systems, there has been a continuous effort to increase reader speed in an attempt to provide read-out and processing of information at a rate which may begin to approach the operating and processing rates of computers and similar high-speed equipment. This effort has focussed attention on various components in the readers, because the mechanical units used to positively drive the tape, and to brake the tape to a halt, necessarily require finite times for operation, and cannot be energized and released in the comparatively small time duration utilized for the operation of a simple electronic circuit. If the tape speed is increased, there is a tendency for inadvertent tape movement ("flutter" or "jitter") in the area at which the tape reading occurs, which may cause spurious or erroneous information signals. In addition, if an adequate driving and braking system is provided for continuous high-speed reading, it becomes correspondingly more difficult with conventional components to provide for asynchronous or stepping operation of the reader system, in that the frequent operation and release of the drive and brake units effects a considerable wear of the system. In addition to this wear, an objectionable noise level is frequently produced which militates against the utilization of many readers in rooms where operating or other personnel are located.

It is therefore another important object of the invention to provide a high-speed photoelectric reader system in which positive and accurate tape reading can be attained at a high speed, and in which inadvertent movement of the tape is obviated to enhance the accuracy of operation.

A related object of the invention is the provision of positive drive and braking means which, although rapid and effective in operation, can nevertheless be rapidly released and reengaged without undue wear or noise in the system.

The foregoing and other objects of the invention are realized, in a preferred embodiment, by providing novel and unobvious brake and capstan drive assemblies. At least one of these assemblies is fabricated to include a base or reference portion in which a first segment of a magnetic circuit is supported. A second or movable member is also provided, and a second segment of the magnetic circuit is supported within the movable member; the first and second segments together define a substantially continuous magnetic circuit.

To minimize adjustment, both initially and subsequently to compensate for wear, a flexible mounting means such as a spring is provided to support and align the movable member. The spring provides a flexure pivot for the movable member. The spring produces an additional advantage, being biased initially so that the movable member is always urged toward the fixed member; this bias force is utilized to provide a positive contact with the tape both when the assembly is energized and when it is de-energized. When such a bias is utilized in both the drive assembly and the brake assembly, disposed one on either side of the read head, flutter or jitter of the tape at the read head is precluded and the system can operate at a very high speed with a high degree of accuracy.

It is possible to simply and rapidly modify the tape path by providing an extra mounting aperture in the front panel of the reader, and removing an adjustable tape guide and replacing it in the second aperture to modify the tape path in such a manner that the first angle, or angle of light incidence, is substantially equal to the second angle at which the light is reflected from the tape toward the sensing means. In this arrangement specular reading is provided to afford maximum efficiency and speed for reading tapes such as chadless tape. In addition to providing specular reflection, placing the adjustable guide in the second position provides a tape path which forces open the "chads" in the chadless tape, producing a definite aperture at the location of a mark.

The movable tape guide can also be provided with an adjustment along an axis substantially normal to the path of tape movement, so that tapes of different widths can be readily accommodated by the system. In one embodiment the adjustable tape guide is provided with a first range of adjustments effected in steps of preassigned extent to accommodate tapes of different widths, and a second range of fine or vernier-type adjustment to accommodate minor irregularities in the tape.

In order to acquaint those skilled in the art with the best mode contemplated for making and using the invention, an explanation thereof is set forth in connection with the accompanying drawings, in the several figures of which like reference numerals identify like elements, and in which:

FIGURE 1 is a perspective view depicting the physical mounting of one embodiment of the invention;

FIGURE 2 is an exploded perspective view, depicting elements comprising the read head or photoelectric sensing portion of the reader;

FIGURE 7 is a front view generally similar to FIGURE 5 illustrating the manner in which the tape path can be modified to change the reader operation from non-specular to specular reading;

FIGURE 8 is an illustrative showing useful in explaining the construction and operation of the brake and drive capstan assemblies;

FIGURE 9 is a front view of a brake assembly as utilized in a preferred embodiment of the inventive system;

FIGURE 10 is a perspective view of a drive assembly for use in the inventive arrangement;

FIGURE 11 is a block diagram illustrating a control arrangement for the inventive system; and FIGURE 12 is a schematic diagram illustrating in more detail the control arrangement shown generally in FIGURE 11.

GENERAL DESCRIPTION

Figure 3:
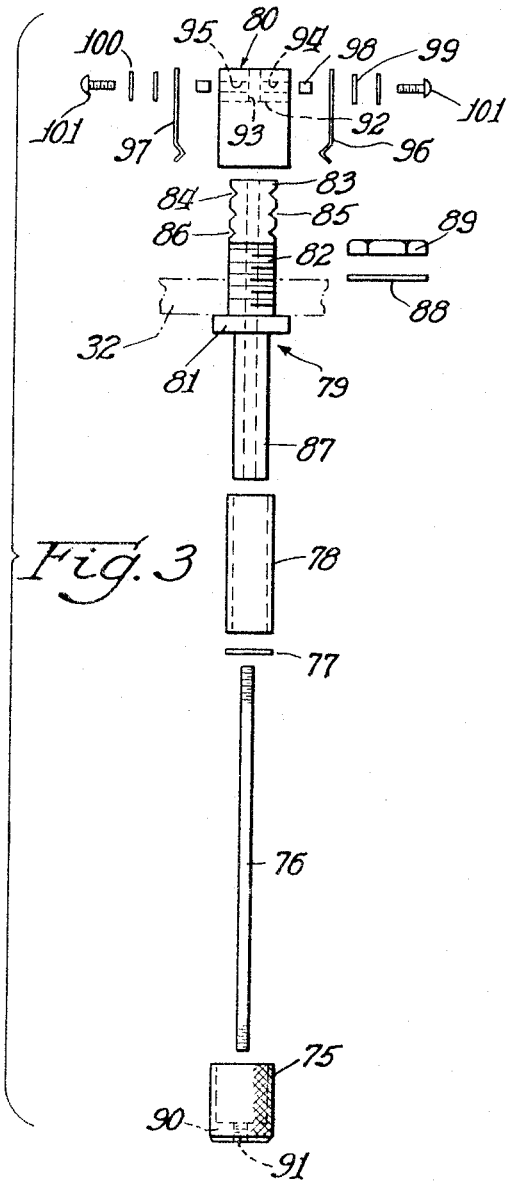
FIGURE 3 is an exploded plan view.

FIGURE 1 depicts a photoelectric reader 20 constructed in accordance with the inventive teaching to derive information printed or otherwise imposed on a tape 21, which may be comprised of paper, plastic or other materials. To facilitate the explanation, it will be assumed that information is depicted on the tape by printing or darkening spots at certain locations. Movement of the tape is from right to left, the tape being displaced from the lower right hand portion past first damper spring 22, over first fixed tape guide 23, between upper portion 36 and lower portion 35 of brake assembly 24, under the reading head 25 and over an adjustable tape guide assembly 26, between upper portion 44 and lower portion 45 of a capstan or drive assembly 27, over a second fixed tape guide 28, and downwardly adjacent a second damper spring 29 toward an associated unit, such as a reeler or rewind unit (not shown).

In more detail, first damper spring 22 comprises an end portion suitably apertured to receive a fastening screw 30 which secures the end portion of spring 22 in a semi-circular pillar or support 31 extending outwardly at right angles from front panel 32 of reader 20. The support pillar can be suitably mounted or secured in the panel, as by having a portion extending through the panel and secured by a nut or other fastening means behind the panel. The other damper spring 29 is similarly formed and mounted.

Tape guide 23 includes an inner reduced diameter portion 33, indicated in broken lines, which extends to an enlarged diameter or shoulder portion (not shown) which abuts panel 32 for fastening thereto. Tape 21 is retained between outer enlarged portion 34 of fixed tape guide 23 and the inner shoulder. Tape guide 28 is similarly constructed and fastened to the front panel 32. Each of these tape guides is fixed, both as respects the distance of enlarged portion 34 from front panel 32, and the fact that reduced-diameter portion 33 does not rotate; tape 21 slides freely over this portion of the tape guide.

Brake assembly 24 is a tape control assembly which regulates, at least in part, movement of tape through the system. Assembly 24 comprises a lower fixed unit 35, and an upper unit 36, at least a portion of which is displaceable in response to energization and release of this unit. That is, the physical disposition of the upper unit is such that a part of unit 36 always engages tape 21 and presses the tape against lower unit 35, to provide at least a slight drag or retarding force on the tape at this point in the system. In accordance with the inventive arrangement, as the brake assembly is energized to positively halt the tape at this point, the movable portion of upper unit 36 is displaced through a barely perceptible distance to halt the tape. The structure and operation of the upper and lower units 36 and 35 will be described more fully hereinafter.

To the left of brake assembly 24, read head 25 is visible. The visible part is actually the lowermost portion of a casting, which not only supports photosensitive elements for detecting changes in the level of light reflected from tape 21, but also supports a lens system for directing light energy downwardly onto the tape. In the showing of FIGURE 1 such lens system is not visible because it is shielded by the hood assembly 37, which extends outwardly from front panel 32 and shields the light source, the lens system and other components from dirt and inadvertent damage. Hood 37 comprises a pair of oppositely-disposed flange portions 38 (only one of which is visible) at the rear of the hood assembly. The flange or mounting portions are suitably apertured to facilitate passage of a fastening screw 40, and the screw is received in a correspondingly tapped portion of the front panel. U-shaped cutouts 42 in the front panel facilitate the mounting of the reader in a vertical rack arrangement, if such arrangement is desired.

Adjustable tape guide 26, like the fixed tape guides, includes a reduced-diameter portion and an outer portion which restrains the tape against movement away from panel 32. Unlike the fixed tape guides 23 and 28, however, adjustable tape guide 26 is disposed for adjustment or movement in three different ways.

Initially, guide 26 is movable along an axis perpendicular to the path of tape movement, or perpendicular to the plane of front panel 32, in discrete steps or increments to accommodate tapes of different widths between an inner shoulder portion and the outer portion of guide 26. In addition to this coarse adjustment, there is a fine, micrometer-type adjustment available on guide 26, which is effected after the initial step adjustment to provide a more precise over-all adjustment. Lastly, the entire adjustable guide assembly 26 can be removed from its indicated location and inserted and secured in aperture 43, to effectively change the operation of the reader system from non-specular to specular reading. Such arrangement and the physical details of guide 26 will be set out more fully hereinafter.

The drive assembly or capstan arrangement 27 includes an upper unit 44 and a lower unit 45. Lower unit 45 comprises a capstan drive roller, supported and driven behind panel 32, and extending through an aperture in reference panel 32 for cooperation with upper unit 44 of the drive assembly. Roller 45 is rubber-covered in this embodiment, but may be provided with a different resilient gripping surface. The "give" or compressibility of the outer surface of roller 45 makes possible the engagement of the upper unit 44 against roller 45 without requiring precise alignment between the mating portions of this assembly.

READ HEAD

Read head 25 is depicted in the exploded perspective view of FIGURE 2. As there shown, a principal component of this assembly is a casting 50 formed to support both the lens system and the sensing or photodiode components. Considering first the lens support portion of the casting, in the upper portion thereof a mounting aperture or receptacle is provided to receive and support the lens system, which directs light energy downwardly toward the tape. This first receptacle is stepped from an uppermost portion 57 to an intermediate reduced-diameter portion 49, below which a rectangular cut-out portion 51 completes the mounting aperture. Also provided is an opening (not shown) below portion 51 to permit the light energy to pass downwardly toward the tape.

To assemble the lens system, lowermost portion 51 is initially coated with Glyptal and plano-convex lens 52 is positioned in portion 51, with the flat portion of the lens facing downwardly. The two semi-circular or segmental lens mask units 53 and 54 are inserted so that their inner portions overlap the outer portions of lens 52, to insure that the width of the light beam which ultimately passes through lens 52 (and is converged thereby) is directed downwardly to impinge on the paper and illuminate an area no wider than the width of the narrowest hole or mark to be read. Fastening screws 55 are passed through the holes in units 53 and 54 and into corresponding apertures in the casting, to secure projection lens 52 and its associated masking elements in place. Screws 55 are tightened, and Glyptal or a similar substance is applied to the screw heads. Another plano-convex lens 56 is provided, to collimate the light rays which strike the upper surface of this lens. The collimating lens is positioned with the curved or convex portion downwardly, in the uppermost portion 57 of the stepped receptacle. Retaining ring 58 is positioned over lens 56 to secure the lens in place.

A second mounting aperture or receptacle 48 is provided in housing 50, and this second receptacle terminates in a plurality of locating apertures 60 disposed to effect the proper positioning of the photodiodes as mounted within housing or casting 50. Sensing assembly 61 is shown in the right hand portion of FIGURE 2, and includes a plurality of photodiodes or sensing elements 62. Only the two photodiodes at the respective ends of the array are indicated, to facilitate the portrayal and explanation, but it will be understood that another seven photodiodes are disposed along a line between the two photodiodes illustrated (in a system which employs an eight-position code with a ninth position utilized for synchronizing or as a sprocket channel). Each photodiode has a pair of terminals coupled over a corresponding pair of conductors 63, which extend between the photodiodes and a support block 64. A pair of mounting and aligning apertures 65 and 66 are defined in block 64. For mounting within casting 50, assembly 61 is displaced downwardly and to the left as viewed in FIGURE 2, until photodiodes 62 bottom in the respective indexing apertures 60. The bottoming is indicated by alignment of apertures 65 and 66 in mounting block 64 with tapped portions (not visible) in the extremity of casting 50.

After photodiode assembly 61 has been positioned, cover plate assembly 67 is displaced upwardly and to the left as viewed in FIGURE 2 to effectively close the bottom portion of casting 50 and to protect the photodiodes during equipment operation. A resilient block 68, which may be formed of open cell sponge neoprene or a related material, is affixed to assembly 67 so that upon proper positioning of assembly 67, the resilient pad abuts the portion of the casting at which the photodiodes are located. Apertures 69 and 70 are defined in plate assembly 67 for alignment with the corresponding apertures 65 and 66 in photodiode assembly 61, and with the tapped apertures (not visible) in casting 50. Screws 71 and 72 are inserted through the aligned apertures to affix cover plate assembly 67 and photodiode assembly 61 in their respective locations.

ADJUSTABLE TAPE GUIDE

Figure 4:
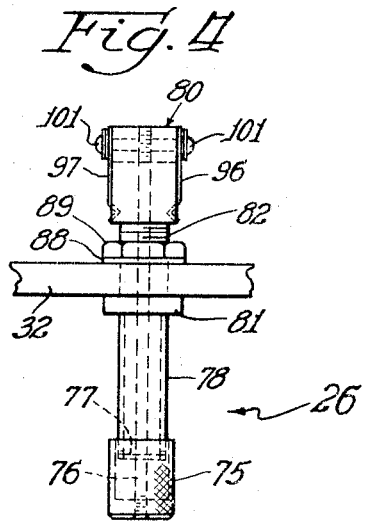
FIGURE 4 is an assembly view, of an adjustable tape guide for use in the inventive reader system.

The adjustable tape guide assembly is illustrated in FIGURE 3. Major components of assembly 26 (from bottom to top in this figure) include a knurled knob 75, a tape guide shaft 76 which is threaded at each end, a retaining ring 77, a tape guide roller 78 which is a hollow cylinder in form and may be formed of Rulon or a similar material, a tape guide post sub-assembly 79, and a detent block 80. After assembly, adjustable tape guide assembly 26 has the form indicated in FIGURE 4, but the various steps utilized to produce such configuration will now be described in connection with FIGURE 3.

Tape guide post 79 may be formed from a single piece of stock, leaving collar portion 81 with the largest diameter of the post sub-assembly. Collar portion 81 abuts front panel 32 as indicated when assembly 26 is formed and positioned against the front panel. A threaded portion 82 is provided adjacent retaining collar 81, and the uppermost part 83 of post 79 (as viewed in FIGURE 3) is first cut to a rectangular cross-section, and then a plurality of aligned pairs of V-shaped apertures 84, 85 and 86 are cut into the opposed edge portions of portion 83. As will become clear from the subsequent explanation, the number and spacing of apertures 84–86 is determined by the number and dimensions of different width tapes to be accommodated by the reader system. A hollow cylindrical portion 87 extends from collar 81 forwardly or outwardly of front panel 32. Post 79 is maintained in the indicated position after collar 81 is disposed flush with front surface of panel 32 by sliding washer 88 over the rear (or uppermost portion as viewed in FIGURE 3) of unit 79, and then sliding nut 89 thereover for fastening on threaded portion 82.

Tape guide roller 78 is positioned over cylinder 87 of unit 79, and retaining ring 77 is press fitted onto the end portion of cylinder 87 to retain roller 78 in position.

Knurled knob 75 is generally hollow, but has a solid front wall 90 defining a tapped aperture 91 for receiving the correspondingly threaded portion of tape guide shaft 76, which is screwed into aperture 91. The end of shaft 76 is peened over to provide a unitary assembly comprising knob 75 and tape guide shaft 76.

Detent block 80, as viewed from the side, is generally U-shaped, with the central area removed back to the line referenced by numeral 92 to admit notched portion 83 of post 79. Detent block 80 further comprises a central tapped aperture 93, and a pair of opposed side apertures 94 and 95. Retaining springs 96 and 97 are mounted at either side of detent block 80 in the following manner. Considering the right hand portion of block 80 as viewed in FIGURE 3, a Rulon plug 98 or a cylinder of similar material is inserted within bore 94. Spring 96, which has an aperture in the end portion for alignment with bore 94, is disposed adjacent detent block 80. A flat washer 99 and a locking washer 100 are disposed adjacent spring 96, and a fastening screw 101 is then inserted so that the threaded portion thereof passes through washers 100 and 99, the apertured end portion of spring 96, and forces Rulon plug 98 into a position where it partially enters tapped central aperture 93. Spring 97 is correspondingly mounted on the opposite side of detent block 80. The assembly including knurled knob 75 and tape guide shaft 76 is then displaced upwardly as viewed in FIGURE 3, so that shaft 76 passes through the interior of tape guide post sub-assembly 79 and the tapped end portion of shaft 76 is received in the correspondingly tapped central bore 93 in block 80. The pressure of the opposed plugs 98 provides sufficient gripping force so that assembly 75, 76 is positively retained in position.

The V-shaped or re-entrant extremities of springs 96 and 97 are positioned in one of the opposed pairs of notches 84, 85 or 86 in post 79. Accordingly, even though tape guide post sub-assembly 79 is fixed in position relative to front panel 32, by pushing or pulling knurled knob 75 toward or away from front panel 32, the V-shaped extremities of springs 96 and 97 are displaced (together with detent block 80) and the extremities of these springs are seated in another notch pair, depending upon the displacement of knob 75. Such displacement therefore provides a coarse or rough adjustment of the extent of roller 78 exposed between collar portion 81 and the uppermost portion of knurled knob 75. It is emphasized again that knob 75 is hollow, so that during such adjustment the knob can enclose a portion of roller 78 without in any way affecting the adjustment and alignment of assembly 26.

In accordance with another aspect of the invention, a fine or vernier-type control is afforded by effecting rotation of knob 75, much as a micrometer is adjusted. With such rotation, shaft 76 is correspondingly displaced, and the threaded extremity of shaft 76 rotates between plugs 98 in tapped bore 93, thus effecting a minute lateral displacement of knob 75 with respect to collar 81.

Figure 5:
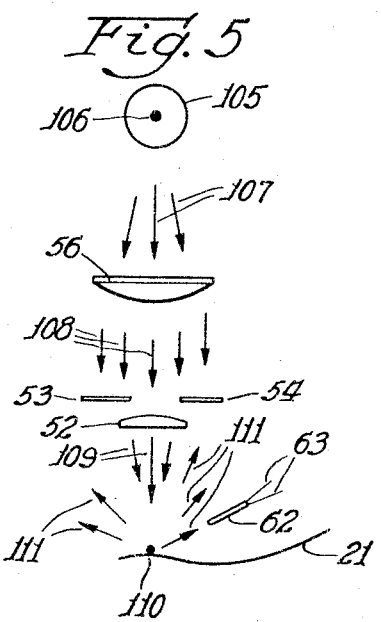
FIGURE 5 is a simplified front view depicting operation of the read head in a preferred embodiment of the invention.

FIGURE 5 shows the lens array of a preferred embodiment of the invention as related to a source of light, indicated as a bulb 105 having a filament 106. The filament emits light radiation in all directions, and of this light energy, certain rays 107 strike the flat upper surface of lens 56, the collimating lens which refracts every ray except those which strike the lens at the precise center. From the lower surface of lens 56, rays 108 travel substantially parallel each other toward the aperture defined between mask elements 53 and 54 to strike the upper or convex surface of projection lens 52. The radiation which is not blocked by elements 53 and 54 strikes the upper surface of lens 52, and all but the centermost rays are refracted thereby, to emerge in a pattern, evidenced by arrows 109, in which all the rays are directed at a point 110 which denotes the reading location at the surface of tape 21. At this location the tape passes over roller 78 (FIGURE 4) of the adjustable tape guide assembly.

Figure 6:
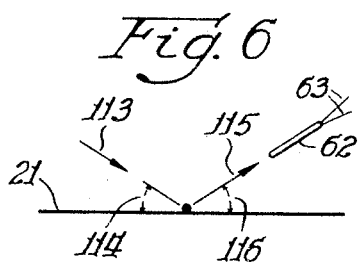
FIGURE 6 illustrates in simplified form specular reflected reading as utilized previously.

It is noted that the light energy directed downwardly by the lens system is incident upon one surface of the tape, the upper surface, at a first angle. In this embodiment, with tape guide assembly 26 positioned as shown, this first angle is substantially a right angle. The incident light strikes the tape and is scattered in all directions, as represented by arrows 111 (FIGURE 5). Accordingly it is apparent that the reading system of the present invention utilizes a non-specular arrangement, with no attempt to provide an angle of reflection toward photodiodes 62 such that the maximum amount of radiation 109 is reflected toward the photodiodes to provide a hole or no-hole signal over conductors 63. This operation is in contradistinction to certain known methods of reading, as shown in FIGURE 6, wherein the incident radiation represented by arrow 113 is directed toward the surface of the tape to strike the reading location at a first angle 114 with respect to the tape. Accordingly the major portion of the incident radiation is reflected from the continuous portions of tape 21 and directed upwardly, as evidenced by arrows 115, at a second angle 116 (with respect to tape 21) to strike the photodiodes and provide a signal over conductor 63. By making angle 114 substantially equal to angle 116, specular reading is provided, wherein the bulk of the incident radiation is reflected along the desired path to provide a maximum change in the level of light reaching the photodiodes when a mark appears in or on tape 21. However, because of the wide variation in signal level, caused not only by the substance of the tape itself but also by the surface gloss or sheen, correspondingly high variations in the level of reflected light may occur with the system of FIGURE 6 when no mark appears on the tape.

The present invention substantially eliminates errors caused by wide signal variations in which specular reflected-light reading is utilized, in which the angle of incidence of the incoming light energy is substantially equal to the angle of reflection of the majority of the reflected energy toward the sensing unit. The present invention provides non-specular reading by directing illuminating light energy toward the tape at reading location 110 (at FIGURE 5), and the reflected energy is directed in all directions from point 110. It is noted that, although not visible in FIGURE 5, adjustable tape guide 26 cooperates with the underside of the casting housing photodiodes 62 to modify the path of tape 21 and provide the requisite angles of incidence (substantially at a right angle) and reflection (other than a right angle) at the reading location. With the arrangement shown in FIGURE 5, a substantial improvement in accuracy has been obtained with higher speeds than are practical in earlier systems.

In the showing of FIGURE 1 an alternate mounting aperture 43 is defined in the front panel 32 of reader 20. By removing tape guide assembly 26 and re-assembling the assembly in aperture 43, the path of tape 21 can be modified as indicated in the lower portion of FIGURE 7. With such repositioning of adjustable tape guide assembly 26, the angle of incidence of the illuminating energy 109 is made substantially equal to the angle of reflection of the energy, represented by arrow 159, which impinges on photodiodes 62. Thus with a simple operation the path of the tape can be modified to provide specular reading. It has been found that specular reading, such as indicated in FIGURE 7, is of high utility when chadless tape is read, in that the bending of the chads as the tape passes under the photodiodes and then up and around a portion of the periphery of tape guide 26 permits additional light to pass through the tape, and thus less light is reflected toward the photodiodes. Manifestly the arrangement of the invention with two alternate mounting apertures for tape guide assembly 26, to provide non-specular and specular reflected reading of the tape in a single system, represents a significant contribution of this art.

TAPE CONTROL ASSEMBLIES

Brake assembly

Considering now tape control assemblies 24 and 27 as shown generally in FIGURE 1, a simplified showing of one tape control assembly is depicted in FIGURE 8. As the tape 21 is displaced through a modern reader system at high speeds, of the order of 100 inches per second or faster, it is necessary both to accelerate the tape up to such speed in a minimum time and to effectively halt the tape in a minimum time after a control signal is given. In accordance with an important aspect of the invention, each tape control assembly is comprised of a fixed base member and a displaceable member, respectively referenced by numerals 118 and 119 in FIGURE 8. The lower or fixed portion 118 encloses a first segment 120 of a magnetic circuit, which circuit is completed by a second segment 121 supported within upper or movable portion 119 of assembly 24. Energizing or signal-converting means such as a winding 122 is disposed adjacent segment 120 in the fixed unit, and a pair of electrical conductors 123 and 124 are provided to effect the requisite energization and de-energization of winding 122. Such an assembly is readily constructed, in that the two core segments 120 and 121 can be disposed within their respective members and a filling material, such as epoxy resin, used to fix core segments 120 and 121 in place. In that these segments are separated only by a minimum distance, the thickness of tape 21, a very good and substantially continuous flux-conductive path is defined over segments 120 and 121. It is noted that the extremities of segment 120 terminate substantially flush with the upper surface of member 118, against which surface tape 21 bears. Likewise the extremities of segment 121 terminate flush with the lower surface of member 119, and the extremities of the two segments are aligned with each other.

Thus, responsive to application of a suitable energization signal over conductors 123 and 124, current flows through winding 122 and flux is produced. The flux traverses the path including segments 120 and 121 to attract movable member 119 downwardly, bearing against tape 21 which in turn bears against upper portion 118 of assembly 24. Upon de-energization of winding 122, the flow of flux is interrupted, and the high braking force is removed, but as will become apparent from the subsequent explanation, a small bias force is maintained to urge portion 119 against the tape and base member 118 to positively contact and retain the tape in this portion of the system and obviate flutter or jitter during operation.

FIGURE 8 indicates brake assembly 24 in more detail. As there shown, lower unit 118 is affixed to a base or mounting plate 128, suitably apertured for fastening by a pair of mounting screws 129 and 130 to front panel 32 of the reader system. In the cap assembly, a support plate 131 is secured to front panel 32 by another pair of mounting screws 132 and 133. In accordance with another important aspect of the invention, shoe member 119 is coupled over a resilient or flexible member, depicted as a spring 134, to support block 131, and thus the movable member is supported from the front panel. The horizontal portion of leaf spring 134 is bifurcated to define two legs extending adjacent the lower surface of member 119 and secured thereto by fastening screws 135, only one of which is visible. The vertical portion of spring 134 extends along the back wall of support plate 131, and a fastening plate 136 is disposed against the vertical portion of spring 134. Another pair of mounting screws 137, only one of which is visible in the drawing, is utilized to secure the assembly including fastening plate 136, the vertical portion of spring 134, and mounting or support plate 131.

The use of spring 134 as a flexure pivot in the brake assembly is of substantial importance in the effective operation of this arrangement. The flexure pivot substantially eliminates adjustment of the unit upon initial fabrication and installation. If a flexible or a flexure pivot is not utilized, there must be precise adjustment of the pivot arm or other supporting member for shoe unit 119 so that upon energization of the brake assembly, the engagement of the lower surface of unit 119 is flush with the tape riding on the upper surface of unit 118. The flexure pivot maintains these surfaces substantially parallel and automatically compensates for wear over an extended life of the system. As some surface wear occurs on either unit 119 or 118, flush seating is still obtained by the strong pull of the magnetic circuit as winding 122 (FIGURE 8) is energized.

Additionally, and another important aspect of the invention, spring 134 when initially installed is set or deformed to provide a slight but positive downward displacement of upper shoe unit 119 toward base unit 118, to positively contact and retain the tape between these two units. Thus, even when the brake assembly is de-energized, there is a positive force restricting the tape at this location in the reader system. As will be explained, the tape is similarly restricted at the drive assembly, both when energized and when de-energized. In such a system, flutter or jitter of the tape is minimized at the read head location because the tape is positively restrained on each side of the reading location.

In addition, with this slight bias force, there is only a negligible physical displacement of the upper unit or shoe 119 toward and away from lower unit 118 responsive to energization and de-energization of the brake assembly. This minimum physical displacement insures maximum efficiency of operation, contributing to the rapid acceleration of the system from a standing stop to full speed in a minimum time and likewise to the rapid halting of the tape upon energization of the brake assembly. Further, it has been found that the minimum physical displacement reduces to a negligible level the noise attendant upon operation of the system, whereas in certain other reading arrangements where the tape control units are displaced through a greater movement upon energization and de-energization of the assemblies, the noise level has been found objectionable to human workers. In some instances the noise level of such units has approached the threshold of pain.

*Capstan drive assembly*

FIGURE 10 shows the drive or capstan arrangement 27 in more detail. Lower member 45 comprises a rubber or rubber-covered drive cylinder extending through an aperture 140 in front panel 32. The capstan drive motor (not shown) is mounted behind the panel, and is continuously energized whenever the system is energized so that roller 45 is always driven in the counterclockwise direction as represented by arrow 141. Accordingly, to effect displacement of paper to the left as viewed in FIGURE 10, it is only necessary to provide the requisite value of pressure between continuously rotating capstan roller 45 and a pinch roller 154 in the upper part of assembly 27.

The upper portion of the pinch roller and capstan arrangement 27 includes a casting or base housing 142 having a pair of ears or mounting portions extending flush with front panel 32 and secured therein by fastening screws 143 (only one of the screws and mounting ears is visible in this showing). One portion or segment of the magnetic path, such as segment 120 shown in FIGURE 8, is disposed in the upper portion of housing 142 (FIGURE 10) and secured therein by potting or any other process to provide a firm mechanical positioning; the lower surface 144 of this supporting compound is visible in FIGURE 10. The second segment of the magnetic circuit, similar to unit 121 in FIGURE 8, is disposed within support block 145 in FIGURE 10, which block is positioned just above the horizontal portion of bias spring 146 and above one arm of a lever member 147. Block 145 is only used to facilitate connection of the second segment of the magnetic circuit to lever 147. A fastening screw 148 passes through a suitable aperture in the arm of lever 147 and a corresponding aperture in spring 146, and is received within a corresponding tapped portion of block 145. The other or vertical portion of spring 146 is bifurcated and secured to the left wall portion of housing 142 by another fastening screw 149.

The central or mounting portion of Y-shaped lever member 147 is hollowed out to form a bore disposed at right angles to the disposition of the spring 146 and the first arm portion of lever 147. A suitable pivot shaft 150 is passed through the apertures 151, one formed in each of the lower portions of housing 142, and through the bore in lever 147 to support the lever for pivotal movement around shaft 150.

The second arm of lever 147 is bifurcated to define a yoke arrangement including a pair of legs 152 and 153, which provide support for pinch roller 154. The pinch roller itself may be a hollow cylinder, formed of surface hardened aluminum, which may be hardened by the Martin Hard Coat process, a special anodizing process conventionally practiced by many processing firms. This hard surfaced aluminum roller can be inserted over a central mounting shaft which has a pair of reduced-diameter end portions, one of which is designated 155 and shown projecting through a corresponding aperture in leg 152 of the yoke. A securing plate 156 is provided for each leg of the yoke, and plate 156 is notched at one end (the right end as viewed in FIGURE 10), and at the other end defines a suitable aperture for receiving a fastening screw. The notch or U-shaped end portion of plate 156 is positioned to embrace corresponding grooves formed in end portions 155 of the supporting shaft, and a fastening screw 157 is passed through the illustrated aperture to secure fastening plate 156 in place. In this way the pinch roller is readily and speedily mounted.

It is emphasized that the initial set or bias of spring 146 is such as to force the left arm portion of lever 147 and block 145 upwardly, effecting a corresponding downward displacement of legs 152 and 153 of the yoke to cause pinch roller 154 to bear against capstan roller 45, or against tape 21 when it is threaded through the system. Accordingly, even when the capstan drive roller assembly 27 is non-energized, there is a positive downward displacement of the yoke in the right hand portion of lever 147, to cause a positive securing of the tape at this point in the system. In a preferred embodiment, the length of the yoke (from the center mounting portion for shaft 150 to the right hand portion where pinch roller 154 is secured) was approximately 50 percent greater than the distance from shaft 150 to the center of support block 145. Thus the force urging pinch roller 154 toward capstan roller 45 is less than the force with which block 145 is forced toward surface 144 of the upper housing. Such decrease in force minimizes the effects of pinch roller and capstan roller wear, and of irregularities in tape thickness. Even with the assembly de-energized and the brake assembly (FIGURE 9) energized, the bias of spring 146 effects (FIGURE 10) the downward urging of legs 152 and 153 of the yoke to secure the tape against capstan roller 45, to maintain a positive engagement of the tape so there is no sag or flutter of the tape adjacent the reader head.

CONTROL CIRCUIT

In FIGURE 11, a start or input conductor 160 is shown for applying a start signal to an "or" gate 161, which also may receive an input signal over conductor 162. The output side of "or" gate 161 is coupled through an inverter 163, to provide an output signal applied both to the input side of the second inverter 164 and over conductor 165 to a second "or" gate 166, which can also receive a stop signal over input conductor 167. The output side of inverter 164 is coupled through a driver stage 168 to a pinch roller solenoid circuit 169.

The output side of "or" gate 166 is coupled through first and second inverters 170 and 171 in the stop circuit, and through driver stage 172 to brake solenoid circuit 172. The operation of these units will be set forth in more detail in connection with FIGURE 12.

It is emphasized that in the present system, both brake assembly 24 and capstan drive assembly 27 are always positively engaging and thus restraining the tape at each of these locations. This is true whether these units are energized or de-energized. As will become apparent from the explanation in connection with FIGURE 12, normally brake assembly 24 is energized and capstan assembly 27 is de-energized, or when brake assembly 24 is de-energized, then the capstan assembly 27 is energized to move tape through the system. By always providing a positive contact with the tape at each of these locations, flutter and jitter is minimized to obviate erroneous information passed through the reading head, wear on the system is minimized, and very high operating speeds of these units are realized, in that each of these units is displaced through only a minimum and barely perceptible distance as the brake and drive assemblies are turned on and off.

Considering now the detailed showing of FIGURE 12, "or" gate 161 is comprised of a pair of resistors 175 and 202 which cooperate with inverter stage 163 in a known resistor-transistor-logic arrangement. Transistor 163 comprises an input or base electrode 163b, which is coupled through resistor 175 to start input conductor 160; a collector or output electrode 163c shown coupled through another resistor 177 to a terminal 178, to which a unidirectional energizing potential, designated —V1, is applied; and a common or emitter electrode 163e, coupled over conductor 179 to a plane of reference potential, conventionally designated ground. The common junction 180 between collector 163c and resistor 177 is coupled over conductor 165 and resistor 176 to base 170b of inverter 170. Although the transistors illustrated in the schematic diagram of FIGURE 12 are all PNP-type transistors, it will be apparent to those skilled in the art that other types of transistors, such as NPN types, or in fact vacuum tubes, can be substituted for the particular components utilized in the preferred embodiment with the appropriate changes in the polarities of the energizing and signal potentials.

Base 163b of transistor 163 is coupled over resistor 181 to terminal 182, to which a different unidirectional energizing potential designated +V is applied. Common junction 180 is coupled over resistors 183 and 184 to junction 182. It is evident that resistors 177, 183 and 184 are series-coupled between energizing terminals 178 and 182 to provide a voltage divider arrangement. The junction 185 between resistors 183 and 184 is coupled to base 164b of second inverter 164 in the pinch-roller solenoid control circuit. The emitter, base, and collector elements of transistor 164 are respectively indicated by the e, b, and c designations utilized in connection with the first inverter 163, and the same convention is utilized for each of the other transistors 168, 170, 171, 172, and 216.

Base 164b of inverter 164 is coupled to connection 185 of the described voltage divider. Collector 164c is coupled over a series circuit comprising resistors 186 and 187 to energization terminal 182, and the common connection between resistors 186 and 187 is coupled to base 168b of driver transistor 168. Collector 164c is also coupled over another resistor 188 to a conductor 189, shown coupled through an interlock switch 190 and a load-ready switch 191 to another energization terminal 192, to which a unidirectional energizing potential designated —V2 is applied. Thus with the load-ready switch 191 in the illustrated (ready) position and interlock 190 closed, the potential —V2 is applied over conductor 189 to energize the circuit including transistor 164, the emitter of which is coupled to ground. Within pinch roller solenoid circuit 169, emitter 168e of transistor 168 is coupled to ground, and collector 168c is coupled to one end of winding 193, which is the actuating winding for the pinch roller solenoid. That is, upon energization of this winding by current flow through the winding and through transistor 168, the pinch roller is actuated so that the roller bears against the tape and against capstan roller 45 to effect displacement of tape through the system. Upon de-energization of winding 193 by shut-off of transistor switch 168, the pressure of the solenoid is released but even through the flow of flux around the magnetic circuit is interrupted, the utilization of the bias spring with an initial set or deformation is such as to maintain the pinch roller in positive engagement with the tape and capstan as explained previously.

The other end of winding 193 is coupled through a parallel circuit arrangement of resistor 194 and capacitor 195 to conductor 189. Another circuit including a diode or unidirectional conduction means 196 and a resistor 197 is coupled in series between collector 168c and conductor 189. For purposes of the present explanation, it is sufficient to note that when transistor 168 is rendered conductive, the current flow through winding 193 is such as to substantially and rapidly increase the pressure which forces the pinch roller against the capstan drive roller. Upon shut-off of transistor 168, the curent flow through winding 193 rapidly decreases and such pressure is likewise removed. A more detailed consideration of the operation of such circuit is given in the description of FIGURE 2 in a copending application of Vernon Z. Smith, entitled, "Control Circuits," filed Jan. 29, 1963, Ser. No. 254,623, and assigned to the assignee of the present invention.

The other input or stop input conductor 167 is coupled over a resistor 198 to base 170b of transistor 170, which base is also coupled over bias resistor 199 to terminal 182, to which the energizing potential +V is applied. Emitter 170e of the transistor is coupled over conductor 200 to ground, and collector 170c is coupled over a resistor 201 and conductor 202 to conductor 189, in its turn coupled to terminal 192 to which the potential —V2 is applied. Collector 170c is also coupled over conductor 162 and another resistor 202 to base 163b of transistor 163. It will thus be evident that the "or" gate 161 of FIGURE 11 comprises resistors 175 and 202 in FIGURE 12, and the other "or" gate 166 includes resistors 198 and 176 in FIGURE 12.

Collector 170c is coupled over resistors 203 and 204 to energizing terminal 182. Accordingly resistors 201, 203 and 204 form a series circuit between energizing terminals 192 and 182. Junction 205 between resistors 203 and 204 is coupled to base 171b of transistor 171, the emitter of which is coupled over conductor 200 to ground. Collector 171c is coupled over a resistor 206 to conductor 202, and the collector is further coupled over resistors 207 and 208, which are joined at junction 209, to energizing terminal 182. Terminal 209 is coupled over conductor 210 to base 172b of transistor 172, which drives brake solenoid circuit 173.

Collector 172c is coupled through a diode 211, a resistor 212, and another resistor 213 to a junction 214. Also coupled between collector 172c and junction 214 is winding 215 of the brake solenoid, which effects the operation of the brake assembly 24 depicted in FIGURES 1 and 9. That is, when current flows through winding 215, the upper shoe portion of assembly 24 is displaced downwardly to firmly hold the tape between the movable component and the lower base component of the brake assembly.

The junction of resistors 212 and 213 is coupled to base 216b of transistor 216, which has an emitter 216e coupled over resistor 217 to junction 214. Collector 216c of this transistor is coupled over another resistor 218 and conductor 219, through interlock switch 190 and load-ready switch 191, to energizing terminal 192. A resistor 220 is coupled between conductor 219 and resistor 217, and capacitor 221 is parallel-coupled with resistor 220. The operation of this circuit, including the function of transistor 216 is providing a very rapid discharge of capacitor 221 to correspondingly minimize the time of energization and de-energization of the brake assembly, is explained at length in the above-identified copending application of Vernon Z. Smith. Accordingly the particulars of such circuit operation will not be set forth herein.

In considering operation of the circuit depicted in FIGURE 12, attention is directed initially to the interlock switch 190 and the load-ready switch 191 in the right hand portion of the schematic showing. If associated equipment, such as a reeler or spooler (not shown), is actuated to momentarily open interlock switch 190, or if the load-ready switch is displaced to the load position and then returned to the ready position as illustrated, the application of the negative unidirectional potential —V2, from terminal 192 over conductors 219, 189 and 202 to the various circuits, is momentarily (at least) interrupted.

With such momentary interruption of the described energizing circuit, it is evident that the other negative unidirectional energizing potential —V1 is still applied over terminal 178 and resistor 177 to terminal 180. With transistor 163 non-conducting, this transistor or switch is, in effect, an open circuit, and the potential at terminal 180 goes toward the potential at terminal 178, and may reach a level half that potential value. Such negative potential is translated over conductor 165 and resistor 176, and applied to base 170b of transistor 170. The level of this negative potential is sufficient to forward-bias the base emitter circuit of transistor 170, which rapidly reaches saturation with current flowing from ground over conductor 200, the emitter-collector circuit of transistor 170, and through resistor 201 to conductor 202. With the minimum resistance thus exhibited by transistor 170, the potential at collector 170c rapidly approaches ground potential, and this positive-going potential change is applied through conductor 162 and resistor 202 to base 163b of transistor 163, to insure that transistor 163 is maintained non-conducting.

With transistor 170 now conducting and transistor 163 maintained non-conducting, the current flow through transistor 170 changes the voltage distribution across the divider including resistors 201, 203 and 204, such that the potential now applied to the base-emitter circuit of transistor 171 turns this transistor off. As transistor 171 is shut off, another voltage distribution change is effected in the series circuit comprising resistors 206, 207 and 208. With the change in the potential applied from junction 209 over conductor 210 to base 172b being in the negative direction, transistor 172 is rapidly gated on, and current flows from ground over the emitter-collector path of transistor 172, winding 215 of the brake solenoid, terminal 214, resistor 217 and capacitor 221 (during the initial surge) to conductor 219, and ultimately to negative energizing terminal 192. Accordingly the brake assembly is rapidly energized whenever an interruption occurs in the potential circuit leading to terminal 192, whether by manual actuation of the load-ready switch or by operation of interlock switch 190.

With transistors 170 and 172 conducting and transistor 171 non-conducting in the lower or brake circuit, in the upper portion of FIGURE 12 or the pinch roller circuit, only transistor 164 is conducting, with transistors 163 and 168 being shut off at this time. To effect current flow through pinch roller solenoid winding 193, a negative-going pulse is applied over conductor 160 and resistor 175 to base 163b of transistor 163, gating this transistor on and rapidly driving it to saturation. Accordingly the potential at junction 180 rapidly approaches ground potential, and this positive-going potential change is applied over conductor 165 and resistor 176 to base 170b of transistor 170, turning transistor 170 off. As transistor 170 is switched off, the voltage level at collector 170c rapidly changes in the negative direction, and this negative-going potential is applied over conductor 162 and resistor 202 to base 163b of "or" gate 163, thus insuring stage 163 is maintained conductive even though the input pulse received over conductor 160 may be of short duration.

As transistor 163 conducts and the potential at junction 180 goes positive, the potential at junction 185 also goes more positive, and the resultant bias voltage applied to the base-emitter circuit of transistor 164 effects the shut-off of this transistor. As transistor 164 becomes non-conductive the potential at the junction of resistors 186 and 187 goes more negative, gating on transistor 168, which rapidly becomes saturated to provide current flow through this transistor, winding 193, capacitor 195 (until this capacitor is charged and thereafter through resistor 194), to conductor 189. Thus the pinch roller is actuated to bear against the tape and capstan roller 45, and effect the positive driving of the tape through the system.

As transistor 170 was gated off by the positive-going impulse applied to the base when transistor 163 became conductive, the potential at junction 205 goes more negative, turning on transistor 171. Conduction of transistor 171 alters the voltage gradient across the series circuit including resistors 206, 207 and 208 so that the potential at junction 209 goes more positive, to effect shut-off of transistor 172 and de-energization of the brake assembly as the current flow through winding 215 is interrupted.

It is again emphasized that the constant application of negative unidirectional energizing potential —V1 to terminal 178, even when the application of the other negative unidirectional energizing potential —V2 is interrupted, is always effective to provide a potential at junction 180 which is applied to the base 170 to insure that the system always is set in the stop mode and the brake assembly is energized after each interruption of the circuit over which potential —V2 is supplied to the circuitry in FIGURE 12.

To assist those skilled in the art, a table of values of actual components utilized in the embodiment including FIGURE 12 is set out below. It is noted that such description is by way of illustration only, and in no sense by way of limitation.

TRANSISTORS

| | |
|---|---|
| 163 | 2N404 |
| 164 | 2N598 |
| 168 | 2N1545 |
| 170 | 2N404 |
| 171 | 2N598 |
| 172 | 2N1545 |
| 216 | 2N1545 |

DIODES

| | |
|---|---|
| 196 | 1N1487 |
| 211 | 1N1487 |

RESISTORS

| | Value in ohms |
|---|---|
| 175 | 4.3K |
| 176 | 4.3K |
| 177 | 1K |
| 181 | 27K |
| 183 | 2.2K |
| 184 | 30K |
| 186 | 75 |
| 187 | 560 |
| 188 | 250 |
| 194 | 20 |
| 197 | 15 |
| 198 | 4.3K |
| 199 | 27K |
| 201 | 2.7K |
| 202 | 4.3K |
| 203 | 2.2K |
| 204 | 30K |
| 206 | 250 |
| 207 | 75 |
| 208 | 560 |
| 212 | 30 |
| 213 | 56 |
| 217 | 1.5 |
| 218 | 3 |
| 220 | 25 |

CAPACITORS

| | Value in microfarads |
|---|---|
| 195 | 50 |
| 221 | 100 |

ENERGIZING POTENTIALS

| | Value in volts (D.C.) |
|---|---|
| −V1 | −12 |
| −V2 | −24 |
| +V | +12 |

It is therefore apparent that the invention provides a substantially more accurate and positive photoelectric reader system which can operate at higher speeds and thus transfer more information in a given time span. Of substantial importance in the overall system is the provision of a read head in which non-specular or diffuse reading is used to derive the information from the tape. That is, light energy is directed substantially normal to one surface of the tape and is diffused in all directions from the reading location. The photodiodes are oriented at an angle different from the angle of incidence, and thus pick up a smaller portion of the reflected light than would be obtained in specular reading. Thus variations in the background or signal level caused by differences of tape substances and top finish are minimized. For those applications, such as the reading of chadless tape, where specular reading is desired, the photoelectric reader of the invention is simply and swiftly altered by removing the adjustable tape guide and reinserting the guide assembly in another mounting aperture in the front panel, thus providing a second tape path through the system which effectively produces specular reading. The read head is further increased in efficiency by providing a tape guide which is adjustable not only in rough or coarse increments to accommodate tapes of different widths, but also includes a fine, micrometer-like adjustment to effect a more precise or vernier-type adjustment of the tape guide system.

Also contributing significantly to the increased speed and accuracy of the invention is the utilization of novel tape control assemblies, each comprising a fixed portion supporting one segment of a magnetic circuit, and a movable portion supporting a complementary segment or the remainder of the magnetic circuit. In one embodiment, such as that illustrated in connection with the brake assembly, the tape path is between these fixed and movable portions, so that passage of magnetic flux around the segments of the magnetic circuit provides a strong attraction between the two portions of the tape control assembly. Enormously simplified adjustment upon installation, and automatic compensation for wear during operation, is provided by supporting the movable member on a spring or flexure pivot, which is provided with an initial set such that the two portions of the assembly always bear against each other to positively retain the tape. The drive capstan assembly differs somewhat from the brake assembly in that both the fixed and movable components are mounted on the same side of the tape path, but a spring or other resilient bias means is also provided to minimize alignment and related problems and to provide for constant engagement of the pinch roller with the capstan roller. The brake and/or drive assembly may find utility in other material handling systems, in which the movement of a strand or line of material is controlled.

While only a particular embodiment of the invention has been described and illustrated it is apparent that modifications and alterations may be made therein. It is therefore the intention in the appended claims to cover all such modifications and alterations as may fall within the true spirit and scope of the invention.

We claim:

1. In a photoelectric tape reader having a read head for sensing information on a tape moved past the head, a tape control assembly disposed at one side of said read head comprising a base, a first portion of a magnetic circuit disposed within said base, a member disposed adjacent said base, flexible means affixed to said movable member to provide a flexure pivot for said movable member and afford movement of the member toward and away from said base, a second portion of said magnetic circuit, complementary to said first portion, disposed within said member in a position to effect said movement of the member responsive to passage, and interruption of passage, of flux around said magnetic circuit, and means for selectively passing flux around said magnetic circuit to govern operation of said tape control assembly.

2. In a photoelectric tape reader having a read head for sensing information on a tape moved past the head, a first tape control assembly disposed at one side of said read head, a second tape control assembly disposed at the other side of said read head, at least one of said tape control assemblies comprising a support unit, a first segment of a magnetic circuit disposed within said support unit, energizing means disposed adjacent said first segment for providing magnetic flux responsive to energization thereof, a movable unit disposed adjacent said support unit, resilient means affixed to said movable unit to provide a flexure pivot as said movable unit is displaced toward and away from said support unit, said resilient means having an initial set to bias said movable unit toward said support unit and effect positive engagement of the tape by said tape control assembly, a second segment of said magnetic circuit, complementary to said first segment, disposed within said movable unit in a position to afford movement of said movable unit toward said support unit responsive to energization of said energizing means, and means for applying energizing signals to said energizing means to govern the operation of said tape control assembly.

3. In a photoelectric tape reader having a front panel, a read head supported from said front panel to sense information on the tape as it passes said read head, drive means supported from said front panel for displacing the tape past said read head, and a brake assembly having a base affixed to said front panel and disposed on one side of the tape path, a first segment of a magnetic circuit supported in said base, a movable member in the brake assembly disposed on the other side of the tape path, a second segment of said magnetic circuit supported in said movable member, spring means having a first portion supported from said front panel and a second portion affixed to said movable member to provide a flexure pivot for the movable member of the brake assembly, said spring means further providing a bias force urging said movable member toward said base to positively grip the tape between the base member and movable member both when said magnetic circuit is energized and when said circuit is de-energized, and means for energizing and de-energizing said magnetic circuit.

4. In a material handling system for regulating the displacement of a strand of material, drive means for engaging said strand and displacing said strand through the system, and a brake assembly, including a base member affixed in a reference position on one side of the strand and having a surface against which the strand passes, a first segment of a magnetic circuit supported in said base member and terminating substantially flush with said surface, a movable member in the brake assembly disposed on the other side of the strand and having a surface for engaging said strand, a second segment of said magnetic circuit supported in said movable member and terminating substantially flush with said surface of the movable member, spring means affixed to said movable member to provide a flexure pivot for the movable member of the brake assembly, said spring means further providing a bias force urging said movable member toward said base member to positively grip the strand between the base member and movable member both when said magnetic circuit is energized and when said magnetic circuit is de-energized, and means for energizing and de-energizing said magnetic circuit.

5. A brake assembly for regulating displacement of a tape with respect to a reference panel, comprising:
   a base assembly including a base plate, a base member affixed to said base plate and having a surface against which the tape bears, a first segment of a magnetic circuit supported within said base member and having a pair of extremities terminating substantially flush with said surface of the base member, inductive means for converting electrical energy into magnetic flux disposed adjacent said first segment within the base member, and means for affixing said base plate to said reference panel,
   and a cap assembly comprising a support plate, a shoe member having a surface for engaging said tape, a second segment of said magnetic circuit disposed within said shoe member and having a pair of extremities terminating flush with said surface of the shoe member to cooperate with said first segment in defining a substantially continuous magnetic circuit for the passage of flux, spring means having a first portion affixed to said support plate and a second portion affixed to said shoe member, to position said surface of the shoe member substantially parallel with said surface of the base member, the extremities of said segment in the shoe member being aligned with the extremities of said segment in the base member, said spring means having an initial deformation to urge the shoe member toward said base member, and means for affixing said support plate to said reference panel,
   whereby transfer of electrical energy to said inductive means is effective to pass flux around said magnetic circuit and substantially increase the force displacing the shoe member toward the base member to positively grip and halt the tape.

6. In a photoelectric tape reader having a front panel, a read head supported from said front panel to sense information on the tape as it passes said read head, brake means supported from said front panel for retarding tape movement, and a drive assembly including a capstan roller extending from said front panel on one side of the tape path, a base housing affixed to said front panel and disposed on the other side of the tape path, a first segment of a magnetic circuit supported in said base housing, lever means mounted in said base housing, a second segment of said magnetic circuit supported by said lever means, pinch roller means supported by said lever means for engaging said capstan roller, spring means having a first portion affixed to said base housing and a second portion affixed to said second segment of the magnetic circuit to provide a bias force displacing said lever means to urge the pinch roller toward said capstan roller to positively grip the tape between the rollers both when said magnetic circuit is energized and when said circuit is de-energized, and means for energizing and de-energizing said magnetic circuit.

7. In a material handling system for regulating the displacement of a strand of material, brake means for engaging and gripping the strand to halt its displacement through the system, and a drive assembly including a capstan roller extending at substantially right angles to the path of strand movement on one side of said path, said capstan roller being driven whenever the system is energized, a base housing affixed in a reference position on the other side of said path, a first segment of a magnetic circuit supported in said base housing, a lever having a central mounting portion and first and second arm portions, pivot means for mounting said lever in the base housing, a second segment of said magnetic circuit supported on one of the lever arms to define, with said first segment, a substantially continuous magnetic circuit, pinch roller means supported on the other of said lever arms in a position for engaging said capstan roller, spring means having a first portion affixed to said base housing and a second portion coupled to said second segment of the magnetic circuit to bias the lever in a direction which urges the pinch roller toward the capstan roller to positively grip the strand between the rollers both when said magnetic circuit is energized and when said circuit is de-energized, and means for energizing and de-energizing said magnetic circuit.

8. A capstan drive assembly for regulating displacement of a tape with respect to a reference panel defining an aperture therein, comprising:
   a capstan roller supported and driven from one side of said panel and having a portion extending through said aperture to the other side of the panel adjacent the tape path;
   and a drive assembly comprising a housing affixed to said reference panel on the other side of the tape path, a first segment of a magnetic circuit supported within said housing, a lever having an intermediate portion for pivotal mounting, a first arm portion, and a second arm portion bifurcated to define a yoke arrangement, means for pivotally mounting the intermediate portion of said lever in the housing, a second segment of a magnetic circuit mounted on said first arm portion of the lever and defining, with said first segment, a substantially continuous magnetic circuit, inductive means disposed adjacent said first segment of the magnetic circuit in the housing for converting electrical signals into magnetic flux for passage around said magnetic circuit, a pinch roller supported in the yoke of said lever in a position aligned with said capstan roller, spring means having a first portion affixed to said housing and a second portion coupled to said first arm portion of the lever, said spring having an initial deformation which urges the pinch roller toward the capstan roller and positively retains the tape between the pinch and capstan rollers, both when the drive assembly is energized and when the drive assembly is de-energized, and means for passing electrical signals to said inductive means to effect energization and de-energization of said drive assembly.

9. In a photoelectric tape reader system having a read head for sensing information as the tape is displaced past the read head, drive means disposed at one side of the head head for regulating at least in part movement of tape through the system, and brake means disposed at the other side of said read head for regulating at least in part movement of the tape through the system, the improvement which comprises, means including a flexible spring having a flexure pivot portion in each of said drive means and brake means for continuously gripping the tape, both in the energized condition and in the de-energized condition of each of the drive means and brake means, thereby to preclude inadvertent movement of the tape as it is displaced past the read head.

10. In a photoelectric tape reader system having a reference mounting panel, a read head affixed to said panel for sensing information as the tape is displaced past the read head, a drive assembly positioned at one side of the read head and operable to govern at least in part displacement of tape through the system, and a brake assembly positioned at the other side of the read head for governing at least in part displacement of the tape through the system, the improvement which comprises, a two-segment magnetic circuit in each of said drive and brake assemblies for effecting rapid energization and de-energization of such assemblies, and a resilient bias means having a flexure pivot portion in each of said assemblies for positively gripping the tape both in the energized and deenergized condition of each assembly, thereby to obviate flutter or jitter of the tape as it is displaced past the read head.

11. In a photoelectric tape reader, a front panel defining a pair of mounting apertures, means for displacing tape through the reader past a given location at which information on the tape is sensed, a tape reading assembly including a housing affixed to said panel, means in said housing for collimating light energy and projecting the light energy toward the tape for incidence thereon at a first angle, sensing means in said housing for providing information signals related to the level of light reflected from said one surface of the tape at a second angle, and tape guide means positioned in one of said mounting pertures to modify the tape path at said location in such manner that said second angle is different from said first angle, whereby non-specular reading of the tape is provided, said tape guide means being removable for repositioning in the other of said mounting apertures to modify the tape path at said location in such manner that said second angle is substantially equal to said first angle, whereby specular reading of the tape is provided.

12. In a photoelectric tape reader, means for displacing the tape reader past a given location at which information on the tape is sensed, a tape reading assembly comprising means for directing light energy onto one surface of the tape at said location to strike said surface at a first angle, sensing means disposed on the same side of the tape as the light directing means to receive light energy reflected from said one surface at a second angle which differs from said first angle to provide non-specular reading of the tape, and adjustable tape guide means positioned adjacent said location, said tape guide means being adjustable along an axis normal to the direction of tape movement to accommodate tapes of different widths in the reader.

13. A photoelectric tape reader as set forth in claim 12, in which the adjustable tape guide means includes first means for affording a coarse adjustment in preassigned steps, and second means for providing a fine adjustment over a range small in relation to the steps of the coarse adjustment.

References Cited by the Examiner
UNITED STATES PATENTS 2,987,249   6/1961   Van Vechten _____ 235—61.11
3,163,746   12/1964   Hoeser _____ 235—61.11

MAYNARD R. WILBUR, *Primary Examiner.*

D. W. COOK, *Assistant Examiner.*